(12) United States Patent
Luken et al.

(10) Patent No.: US 6,534,210 B2
(45) Date of Patent: Mar. 18, 2003

(54) AUXILIARY CONVECTIVE FUEL CELL STACKS FOR FUEL CELL POWER GENERATION SYSTEMS

(75) Inventors: Richard Eric Luken, Farmington Hills, MI (US); Pam Dawson, Dearborn, MI (US); Robert Mohan, Canton, MI (US); Vijay K. Garg, Canton, MI (US); Prabhakar Singh, Richland, WA (US)

(73) Assignee: Visteon Global Technologies, Inc., Dearborn, MI (US)

( * ) Notice: Subject to any disclaimer, the term of this patent is extended or adjusted under 35 U.S.C. 154(b) by 219 days.

(21) Appl. No.: 09/760,948

(22) Filed: Jan. 16, 2001

(65) Prior Publication Data

US 2002/0094463 A1 Jul. 18, 2002

(51) Int. Cl.[7] .............................................. H01M 8/04
(52) U.S. Cl. .............................. 429/13; 429/23; 429/34
(58) Field of Search ............................ 429/23, 13, 34

(56) References Cited

U.S. PATENT DOCUMENTS

| | | | |
|---|---|---|---|
| 5,318,863 A | 6/1994 | Dhar | 429/30 |
| 5,360,679 A | 11/1994 | Buswell et al. | 429/19 |
| 5,482,790 A | 1/1996 | Yamada et al. | 429/9 |
| 5,503,944 A | 4/1996 | Meyer et al. | 429/13 |
| 5,521,020 A | 5/1996 | Dhar | 429/142 |
| 5,794,732 A * | 8/1998 | Lorenz et al. | 429/13 X |
| 5,846,669 A | 12/1998 | Smotkin et al. | 429/41 |
| 5,981,096 A | 11/1999 | Hornburg et al. | 429/17 |
| 5,991,670 A | 11/1999 | Mufford et al. | 701/22 |
| 6,007,930 A | 12/1999 | Adams et al. | 429/13 |
| 6,068,941 A | 5/2000 | Fuller et al. | 429/13 |

* cited by examiner

Primary Examiner—John S. Maples
(74) Attorney, Agent, or Firm—Scott Confer; John Kajander; Larry Shelton

(57) ABSTRACT

A fuel cell power generation system is disclosed which includes a primary fuel cell stack for generating a first quantity of electric power, an auxiliary fuel cell stack for generating a second quantity of electric power, a fuel handling subsystem for feeding a fuel containing hydrogen to the primary fuel cell stack and the auxiliary fuel cell stack, an oxidant handling subsystem including a compressor for feeding an oxidant containing oxygen to the primary fuel cell stack, and a controller electrically connected to the primary fuel cell stack, the auxiliary fuel cell stack, the fuel handling subsystem and the oxidant handling subsystem for controlling operation of the fuel cell power generation system. In one version of the fuel cell power generation system, the controller executes a stored program to sense a startup signal for the fuel cell power generation system, to initiate operation of the auxiliary fuel cell stack, and to apply at least a portion of the second quantity of electric power generated by the auxiliary fuel cell stack to the oxidant handling subsystem to initiate operation of the primary fuel cell stack.

19 Claims, 1 Drawing Sheet

AUXILIARY CONVECTIVE FUEL CELL STACKS FOR FUEL CELL POWER GENERATION SYSTEMS

BACKGROUND OF THE INVENTION

1. Field of the Invention

This invention relates to a power generation system using a fuel cell. More particularly, the invention relates to a fuel cell power generation system including an auxiliary fuel cell stack for generating sufficient electrical power to start fuel cell subsystems such as an air compressor and to operate loads that need power during shut down conditions.

2. Description of the Related Art

Fuel cells are energy conversion devices which produce heat and direct current electrically from a chemical fuel and an oxidizer through a continuous electrochemical reaction. There are multiple types of fuel cells and a typical fuel cell stack is made of a number of cells wherein each cell has an anode, a cathode, and an electrolytic layer therebetween. The main difference between various fuel cell stacks is the type of electrolytic layer used. In Proton Exchange Membrane (PEM) fuel cells, fuel containing hydrogen is supplied to the fuel chamber at the anode and an oxidant gas containing oxygen is supplied to the air chamber at the cathode to generate electric power.

A fuel cell power generation system includes a fuel cell and several auxiliary units (balance of plant) to provide logistics and support for safe and reliable operation. These subsystems include: fuel handling, oxidant handling, water management, thermal management, and a control system. The fuel handling subsystem consists of a fuel storage tank, valves, and regulators to control pressure and fuel flow. The oxidant handling subsystem supplies air to the cell by means of a compressor or air pump. The water management subsystem consists of a condenser, tank, and a pump needed for collecting water exiting the fuel cell stack. The thermal management subsystem is required to cool the stack and typically consists of a heat exchanger, pump, and coolant. The fuel cell system, inclusive of the support peripherals, also requires a control system, typically a controller.

It is generally known that a primary difficulty associated with fuel cell power generation systems is the initiation time of the electrochemical reaction within the fuel cell stack. A fuel cell power generation system which includes the above mentioned subsystems requires a substantial amount of electrical power to operate auxiliary systems, with the most demanding being the oxidant handling and thermal management subsystems. Electrical loads of these units can be over 20% of the total fuel cell output power. Further, power must first be delivered to the support subsystems to start up the fuel cell stack. Current PEM fuel cell systems require a large battery pack to support these start up loads, as well as the shutdown condition (i.e., key-off) loads.

It has been proposed to use a 12 volt battery subsystem to power electrical components in a fuel cell power generation system. However, to increase overall system efficiency and to assure initiation, the above mentioned subsystems of a fuel cell system are operated at a high voltage. Therefore, it is not uncommon for fuel cell battery storage systems and the above mentioned subsystems to be operated in the 300 volt range. However, 12 volt systems are incapable of directly providing the requisite power output to initiate a fuel cell. Further, any DC voltage conversion proves to be inefficient and likely to quickly drain a 12 volt storage battery under difficult starting conditions.

Another difficulty associated with fuel cell power generation systems is that when any fuel cell is to be utilized in an isolated environment, such as in vehicles, the fuel cell may be subject to extreme winter temperatures, such as temperatures from 0° C. (+32° F.) down to as low as −40° C. (−40° .F). Typically, a fuel cell may not be stored below about 0° C. (+32° F.) without freezing. Therefore, when experiencing ambient temperatures below about 0° C. (+32° F.), the fuel cell may freeze. While it has been proposed to use various anti-freeze solutions to solve this problem, this solution requires additional anti-freeze supply and transport equipment within the fuel cell power generation system.

What is needed, therefore, is an improved system for providing start up power to fuel cell support subsystems and for providing power to support key-off system loads for land based or vehicular fuel cell applications. It is further desirable to provide a method of fuel cell operation in which the problems associated with low temperature use are eliminated without anti-freeze solutions.

SUMMARY OF THE INVENTION

The foregoing needs are met by a fuel cell power generation system that provides a novel approach for providing start up power to fuel cell support subsystems and for providing power to support key-off system loads applicable for land based or vehicular fuel cell applications. To meet the demand of the initial power load, an auxiliary fuel cell stack is incorporated into the overall fuel cell power generation system architecture. One exemplary auxiliary fuel cell stack for the fuel cell power generation system is a convective solid polymer fuel cell that operates at ambient temperature and pressure conditions without humidification. The auxiliary fuel cell incorporates an electrolyte membrane different from traditional proton exchange membrane fuel cells in that the auxiliary fuel cell can diffuse oxygen without forced airflow. Only pressurized fuel is required to operate the auxiliary stack.

To start up the fuel cell system, power generated by the auxiliary fuel cell stack is delivered to the fuel cell support subsystems. The subsystems begin operation and initiate the primary fuel cell stack. Oxidant and fuel delivery to the primary fuel cell stack is ramped until the primary fuel cell stack reaches normal operating conditions. At that time, fuel delivery to the auxiliary fuel cell stack is turned off, shutting down the auxiliary fuel cell stack. The primary fuel cell stack then provides subsystem power. Another function of the auxiliary fuel cell stack is to provide the power for the land based/vehicle key-off loads. These are electrical systems which require power even under normal/emergency shut down conditions (integrated computers, engine control module, clocks, theft alarm, etc.) and that require power when the vehicle or land based power generation system is off. In this shutdown mode, power generated by the auxiliary stack is used to support these loads. One highly advantageous use of the power generated by the auxiliary stack during shutdown conditions is the running of a coolant fluid heater and a coolant pump to circulate heated fluid throughout the primary fuel cell stack to avoid freezing of the primary fuel cell stack.

A fuel cell power generation system in accordance with the invention includes a primary fuel cell stack for generating a first quantity of electric power, an auxiliary fuel cell stack for generating a second quantity of electric power, a fuel handling subsystem for feeding a fuel containing hydrogen to the primary fuel cell stack and the auxiliary fuel cell stack, an oxidant handling subsystem for feeding an oxidant containing oxygen to the primary fuel cell stack, and a controller electrically connected to the primary fuel cell stack, the auxiliary fuel cell stack, the fuel handling subsystem and the oxidant handling subsystem for controlling operation of the fuel cell power generation system.

The primary fuel cell stack includes an anode, a cathode, an electrolytic layer positioned between the anode and the cathode, a fuel flow path adjacent a side of the anode opposite the electrolytic layer, and an oxidant flow path adjacent a side of the cathode opposite the electrolytic layer. The auxiliary fuel cell stack includes a fuel electrode, an oxygen electrode, an electrolytic member positioned between the fuel electrode and the oxygen electrode, a fuel distribution path adjacent a side of the fuel electrode opposite the electrolytic member, and an oxidant distribution path adjacent a side of the oxygen electrode opposite the electrolytic member. The fuel handling subsystem is configured to feed a fuel containing hydrogen into the fuel flow path to bring the fuel into contact with the anode of the primary fuel cell stack and to feed the fuel into the fuel distribution path to bring the fuel into contact with the fuel electrode of the auxiliary fuel cell stack, whereby the contacting of the fuel with the fuel electrode generates the second quantity of electric power from the auxiliary fuel cell stack. The oxidant handling subsystem includes a compressor for feeding an oxidant containing oxygen into the oxidant flow path to bring the oxidant into contact with the cathode, whereby the contacting of the fuel with the anode and the contacting of the oxidant with the cathode generates the first quantity of electric power from the primary fuel cell stack.

The controller executes a stored program to sense a startup signal for the fuel cell power generation system, to provide a fuel delivery signal to the fuel handling subsystem to initiate feeding of the fuel into the fuel flow path of the primary fuel cell stack and into the fuel distribution path of the auxiliary fuel cell stack in response to the sensed startup signal, and to apply at least a portion of the second quantity of electric power generated by the auxiliary fuel cell stack to the compressor to run the compressor to feed the oxidant into the oxidant flow path of the primary fuel cell stack in response to the sensed startup signal. In another embodiment of the invention, the controller may be electrically connected to a load and the auxiliary fuel cell stack, and the controller can execute a stored program to sense a load demand from the load (which may be a key-off load), to provide a fuel delivery signal to the fuel handling subsystem to initiate feeding of the fuel into the fuel distribution path of the auxiliary fuel cell stack in response to the sensed load demand, and to apply at least a portion of the second quantity of electric power generated by the auxiliary fuel cell stack to the load in response to the sensed load demand.

BRIEF DESCRIPTION OF THE DRAWINGS

These and other features, aspects, and advantages of the present invention will become better understood upon consideration of the following detailed description, appended claims and accompanying drawing in which

Figure 1:
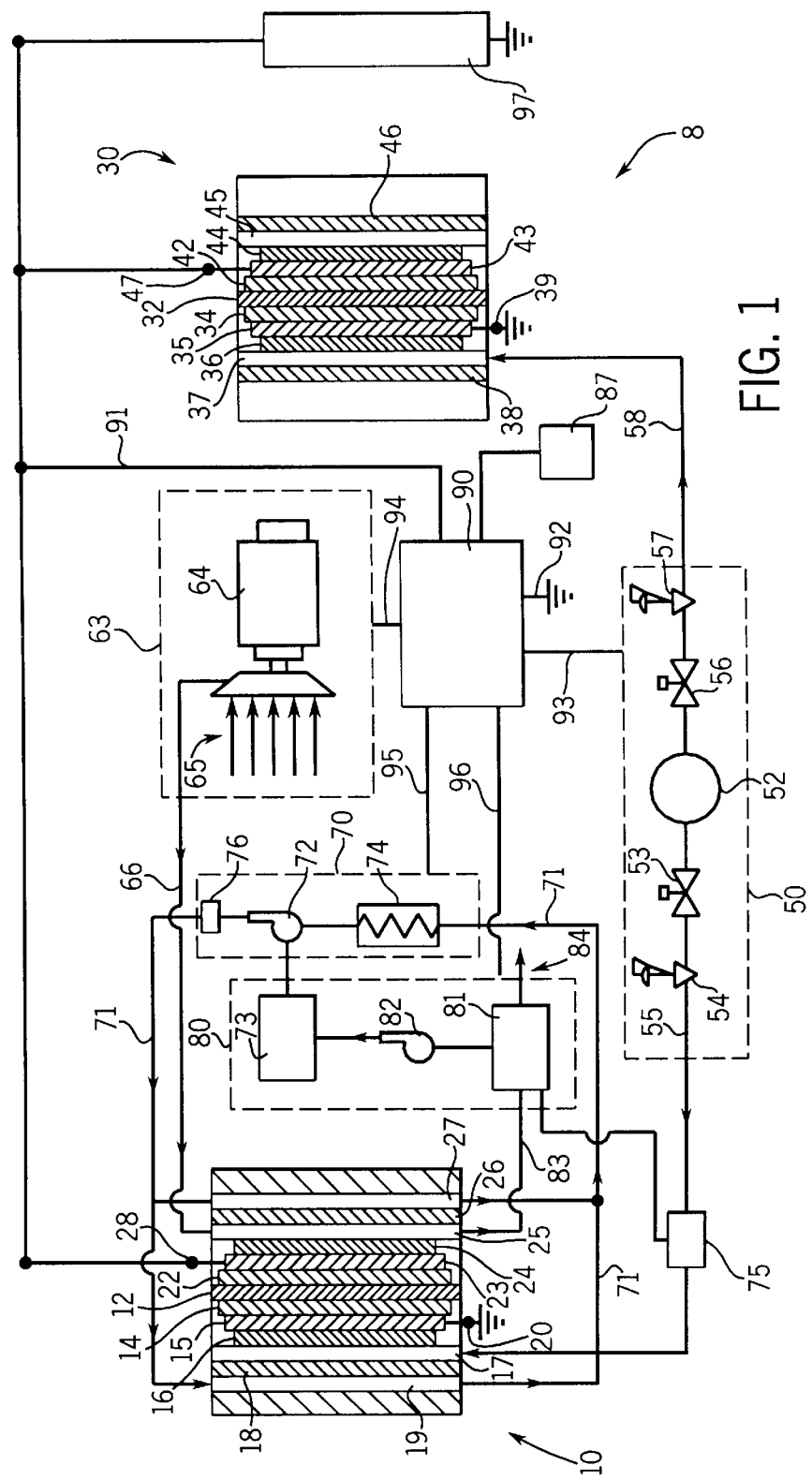
FIG. 1 is a schematic showing an example embodiment of a fuel cell power generation system in accordance with the present invention.

It should be understood that the drawing is not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

DETAILED DESCRIPTION OF THE INVENTION

Referring to FIG. 1, there is shown a fuel cell power generation system in accordance with the present invention. The fuel cell power generation system, indicated generally at 8, broadly comprises a primary fuel cell stack 10, an auxiliary fuel cell stack 30, a fuel handling subsystem 50, an oxidant handling subsystem 63, a thermal management subsystem 70, a water management subsystem 80, and a controller 90.

The primary fuel cell stack 10 is of known construction and comprises a plurality of fuel cells electrically connected in series to each other so as to form the fuel cell stack. Referring to FIG. 1, there is shown schematically one fuel cell of the primary fuel cell stack 10. The fuel cell includes an electrolytic layer 12 that simultaneously acts as a proton conductor and an electron insulator. The electrolytic layer 12 is preferably a solid polymer electrolyte ion exchange membrane such as a perfluorosulfonic ion exchange membrane commercially available from DuPont under the trademark "Nafion". On one (anodic) side of the electrolytic layer 12, there is deposited an anode catalyst 14, preferably platinum, which is covered by an porous anode 15, which is preferably formed of carbon fiber paper. The anode 15 is covered by an anode backing layer 16. An anode partition wall 18 is disposed in spaced apart relationship with the anode backing layer 16 to define a fuel flow path 17. On the side of the anode partition wall 18 opposite the fuel flow path 17, there is an anode coolant flow path 19. On the opposite (cathodic) side of the electrolytic layer 12, there is deposited a cathode catalyst 22, preferably platinum, which is covered by a porous cathode 23, which is preferably formed of carbon fiber paper. The cathode 23 is covered by a cathode backing layer 24. A cathode partition wall 26 is disposed in spaced apart relationship with the cathode backing layer 24 to define an oxidant flow path 25. On the side of the cathode partition wall 26 opposite the oxidant flow path 25, there is a cathode coolant flow path 27. The primary fuel cell stack 10 also includes a positive terminal 28 and a negative terminal 20 for electrical interconnection to other components in the fuel cell power generation system 8.

The primary fuel cell stack 10 generates electrical power by bringing a fuel into contact with the anode 15 and an oxidant into contact with the cathode 23. The fuel is typically a hydrogen-containing material (for example, water, methane, methanol or pure hydrogen), and may be supplied to the primary fuel cell stack 10 in liquid form or gaseous form, such as hydrogen gas. The fuel is introduced at the anode 15 where the fuel reacts electrochemically in the presence of the electrolytic layer 12 to produce electrons and protons in the anode 15. The electrons are circulated from the anode 15 to the cathode 23 through an electrical circuit connecting the anode 15 and the cathode 23. Protons pass through the electrolytic layer 12 to the cathode 23. Simultaneously, an oxygen-containing oxidant, such as oxygen gas or air, is introduced to the cathode 23 where the oxidant reacts electrochemically in presence of the electrolytic layer 12 consuming the electrons circulated through the electrical circuit and the protons at the cathode 23. The halfcell reactions at the anode 15 and the cathode 23 are, respectively, as follows: $H_2 \rightarrow 2H^+ + 2e^-$ and $\frac{1}{2}O_2 + 2H^+ + 2e^- \rightarrow H_2O$. The external electrical circuit withdraws electrical current and thus receives electrical power from the cell. The overall fuel cell reaction produces electrical energy which is the sum of the separate halfcell reactions written above.

The auxiliary fuel cell stack 30 is of known construction, such as that described in U.S. Pat. No. 5,318,863 which is incorporated herein by reference, and comprises a plurality of fuel cells electrically connected in series to each other so as to form the fuel cell stack. Referring to FIG. 1, there is shown schematically one fuel cell of the auxiliary fuel cell stack 30. The fuel cell includes an electrolytic member 32 that simultaneously acts as a proton conductor and an electron insulator. The electrolytic member 32 is preferably a solid polymer electrolyte ion exchange membrane such as a perfluorosulfonic ion exchange membrane commercially available from DuPont under the trademark "Nafion". On one (anodic) side of the electrolytic member 32, there is deposited a fuel electrode catalyst 34, preferably platinum, which is covered by an porous fuel electrode 35, which is preferably formed of carbon fiber paper. The fuel electrode 35 is covered by a fuel electrode backing layer 36. A fuel electrode partition wall 38 is disposed in spaced apart relationship with the fuel electrode backing layer 36 to define a fuel distribution path 37. On the opposite (cathodic) side of the electrolytic member 32, there is deposited an oxygen electrode catalyst 42, preferably platinum, which is covered by a porous oxygen electrode 43, which is preferably formed of carbon fiber paper. The oxygen electrode 43 is covered by a oxygen electrode backing layer 44. An oxygen electrode partition wall 46 is disposed in spaced apart relationship with the oxygen electrode backing layer 44 to define an oxidant distribution path 45. The auxiliary fuel cell stack 30 also includes a positive terminal 47 and a negative terminal 39 for electrical interconnection to other components in the fuel cell power generation system 8.

The auxiliary fuel cell stack 30 generates electrical power by bringing a fuel into contact with the fuel electrode 35 and an oxidant into contact with the oxygen electrode 43. The fuel is typically a hydrogen-containing material (for example, water, methane, methanol or pure hydrogen), and may be supplied to the auxiliary fuel cell stack 30 in liquid form or gaseous form, such as hydrogen gas. The fuel is introduced at the fuel electrode 35 where the fuel reacts electrochemically in the presence of the electrolytic member 32 to produce electrons and protons in the fuel electrode 35. The electrons are circulated from the fuel electrode 35 to the oxygen electrode 43 through an electrical circuit connecting the fuel electrode 35 and the oxygen electrode 43. Protons pass through the electrolytic member 32 to the oxygen electrode 43. Simultaneously, an oxygen-containing oxidant, such as oxygen gas or air, is introduced to the oxygen electrode 43 where the oxidant reacts electrochemically in presence of the electrolytic member 32 consuming the electrons circulated through the electrical circuit and the protons at the oxygen electrode 43. The halfcell reactions at the fuel electrode 35 and the oxygen electrode 43 are, respectively, as follows: $H_2 \rightarrow 2H^+ + 2e^-$ and $\frac{1}{2}O_2 + 2H^+ + 2e^- \rightarrow H_2O$. The external electrical circuit withdraws electrical current and thus receives electrical power from the cell. The overall fuel cell reaction produces electrical energy which is the sum of the separate halfcell reactions written above.

The auxiliary fuel cell stack 30 is different from the primary fuel cell stack 10 in that the auxiliary fuel cell stack 30 operates at ambient temperature (i.e., 0° C. to 60° C.) and pressure (i.e., approximately atmospheric pressure) conditions without humidification. Among other things, the auxiliary fuel cell stack 30 can achieve operation at ambient temperature and pressure conditions without humidification because the electrolytic member 32 of the auxiliary fuel cell stack 30 can diffuse oxygen without forced airflow. This is in contrast to traditional proton exchange membrane fuel cells such as primary fuel cell 10 which require forced flow of oxidant. Preferably, the auxiliary fuel cell stack 30 is configured so as to utilize all of the fuel delivered to the fuel distribution path 37.

In the fuel cell power generation system 8, hydrogen containing fuel is fed into the fuel flow path 17 of the primary fuel cell stack 10 and into the fuel distribution path 37 of the auxiliary fuel cell stack 30 by the fuel handling subsystem 50. The fuel handling subsystem 50 includes a fuel storage tank 52 that is in fluid communication with a primary fuel feed line 55 and an auxiliary fuel feed line 58 for transferring fuel from the fuel storage tank 52. The amount and pressure of hydrogen-containing fuel flowing through the primary fuel feed line 55 is controlled by a primary fuel supply valve 53 and a primary fuel supply regulator 54 which can be manually or automatically operated. Optionally, a humidifier 75 may be arranged in the primary fuel feed line 55. Likewise, the amount and pressure of hydrogen-containing fuel flowing through the auxiliary fuel feed line 58 is controlled by an auxiliary fuel supply valve 56 and an auxiliary fuel supply regulator 57 which can be manually or automatically operated. The primary fuel feed line 55 is in fluid communication with the fuel flow path 17 of the primary fuel cell stack 10 so as to deliver hydrogen-containing fuel from the fuel storage tank 52 to the anode 15 of the primary fuel cell stack 10. Likewise, the auxiliary fuel feed line 58 is in fluid communication with the fuel distribution path 37 of the auxiliary fuel cell stack 30 so as to deliver hydrogen-containing fuel from the fuel storage tank 52 to the fuel electrode 35 of the auxiliary fuel cell stack 30.

In the fuel cell power generation system 8, oxygen-containing oxidant is fed into the oxidant flow path 25 of the primary fuel cell stack 10 by the oxidant handling subsystem 63. The oxidant handling subsystem 63 includes an air compressor 64 which takes in air 65 and then supplies compressed air to the oxidant flow path 25 of the primary fuel cell stack 10 by way of oxidant conduit 66.

The fuel cell power generation system 8 also includes a thermal management subsystem 70 for cooling the primary fuel cell stack 10. Coolant water contained in coolant tank 73 is circulated through a coolant conduit 71 and into the anode coolant flow path 19 and the cathode coolant path 27 of the primary fuel cell stack 10. The coolant water is circulated by coolant pump 72 which can be a fixed or variable speed pump. In the coolant conduit 71, there is located a heat exchanger 74 which lowers the temperature of the coolant exiting the primary fuel cell stack 10. The thermal management subsystem 70 may also include a coolant fluid heater 76 that may be used to heat the coolant water circulated through a coolant conduit 71 and into the anode coolant flow path 19 and the cathode coolant path 27 of the primary fuel cell stack 10.

The fuel cell power generation system 8 further includes a water management subsystem 80. A cathode exhaust stream produced in the cathodic half cell reaction described above flows from the oxidant flow path 25 of the primary fuel cell stack 10 into a water conduit 83. A condenser 81 is located in the water conduit 83 to remove water contained in the cathode exhaust system. The water removed from the cathode exhaust stream may then be used by humidifier 75 or may be transferred by way of water pump 82 into coolant tank 73 for use in the thermal management subsystem 70 as described above. The dewatered cathode exhaust stream exits the condenser at 84.

The operation of the fuel cell power generation system 8 is managed by system controller 90. The controller 90, which may be a programmable logic controller known in the art, is electrically connected to the fuel handling subsystem 50, the oxidant handling subsystem 63, the thermal management subsystem 70 and the water management subsystem 80 by way of lines 93, 94, 95 and 96 respectively. The controller 90 is connected in parallel with the primary fuel cell stack 10 and the auxiliary fuel cell stack 30 by way of line 91 and line 92 which is connected to ground. The controller 90 is also electrically connected to a startup switch 87 which initiates operation of the fuel cell power generation system 8. The controller 90 executes stored programs in order to control operation of the fuel cell power generation system 8.

The electrical power generated by the fuel cell power generation system 8 is used to power at least one load indicated generally at 97. The load 97 may be any load capable of receiving electrical power and in one example embodiment, the load 97 comprises the various electrical loads of an electric vehicle (e.g., traction motor, air conditioning equipment, lights, and key-off loads such as integrated computers, engine control module, clocks, theft alarm, etc.). In addition, the fuel cell power generation system 8 must supply electrical power to various electrical loads in the oxidant handling subsystem 63, the thermal management subsystem 70 and the water management subsystem 80. For example, compressor 64, coolant pump 72 and water pump 82 typically require electrical power for operation.

Having described the construction of the fuel cell power generation system 8, the operation of the system proceeds as follows. Upon activation of the startup switch 87 (which may be an electric vehicle ignition switch when the fuel cell power generation system 8 is used in an electric vehicle), the controller 90 senses a startup signal and provides a fuel delivery signal to the fuel handling subsystem causing the auxiliary valve 56 to move from a closed position to an open position thereby introducing hydrogen-containing fuel into the fuel distribution path 37 of the auxiliary fuel cell stack 30. The auxiliary fuel cell stack 30 responds to the introduction of hydrogen-containing fuel by producing an initial electrical output from the electrochemical reactions described above. The controller senses the electrical output from the auxiliary fuel cell stack 30 and then directs the electrical output to various electrical loads in the oxidant handling subsystem 63, the thermal management subsystem 70 (such as coolant pump 72) and the water management subsystem 80 (such as water pump 82). For example, the controller directs the electrical output of the auxiliary fuel cell stack 30 to the compressor 64 to introduce oxidant into the oxidant flow path 25 of the primary fuel cell stack 10 as described above, and causes hydrogen-containing fuel to be introduced into the fuel flow path of the primary fuel cell stack 10. The introduction of hydrogen-containing fuel and oxidant into the primary fuel cell stack 10 causes the primary fuel cell stack 10 to generate electrical output.

In one version of the fuel cell power generation system 8, the controller 90 senses the startup signal and thereafter provides fuel delivery signals to the fuel handling subsystem 50 such that the fuel feed rate of the fuel into the fuel flow path 17 of the primary fuel cell stack 10 and the oxidant feed rate of the oxidant into the oxidant flow path 25 of the primary fuel cell stack 10 are increased until the controller 90 senses a first electrical power generation level from the primary fuel cell stack 10. In this manner, oxidant and fuel delivery to the primary fuel cell stack 10 are ramped up until the primary fuel cell stack 10 reaches normal operating conditions.

In another version of the fuel cell power generation system 8, the controller 90 executes a stored program to apply a portion of the electric power generated by the auxiliary fuel cell stack 30 to the compressor 64 until the controller 90 senses a first predetermined electrical power generation level from the primary fuel cell stack 10 and to apply a portion of the electric power generated by the primary fuel cell stack 10 to the compressor 64 to run the compressor 64 when the controller 90 senses a second predetermined electrical power generation level from the primary fuel cell stack 8. This control sequence enables different operating conditions for the fuel cell power generation system 8. For example, when the stored program in the controller 90 is configured such that the value of the first predetermined electrical power generation level is equal to the value of the second predetermined electrical power generation level, the controller 90 applies a portion of the electric power generated by the auxiliary fuel cell stack 30 to the compressor 64, and when the controller 90 senses the first predetermined electrical power generation level from the primary fuel cell stack 10, the controller 90 stops applying a portion of the electric power generated by the auxiliary fuel cell stack 30 to the compressor 64 and applies a portion of the electric power generated by the primary fuel cell stack 10 to the compressor 64 to run the compressor 64. Alternatively, when the stored program in the controller 90 is configured such that the value of the first predetermined electrical power generation level is greater than the value of the second predetermined electrical power generation level, the controller 90 applies a portion of the electric power generated by the auxiliary fuel cell stack 30 to the compressor 64, and when the controller 90 senses the second predetermined electrical power generation level from the primary fuel cell stack 10, the controller 90 then applies a portion of the electric power generated by the primary fuel cell stack 10 to the compressor 64 to run the compressor 64. When the controller 90 senses the first predetermined electrical power generation level from the primary fuel cell stack 8, the controller 90 stops applying a portion of the electric power generated by the auxiliary fuel cell stack 30 to the compressor 64. It can be appreciated that in this operating sequence, electric power generated by the auxiliary fuel cell stack 30 and electric power generated by the primary fuel cell stack 10 are simultaneously applied to the compressor 64 for a time period.

In yet another version of the fuel cell power generation system 8, the controller 90 senses a load demand from the load 97 (which may be a key-off load or other shutdown condition load), and the controller provides a fuel delivery signal to the fuel handling subsystem causing the auxiliary valve 56 to move from a closed position to an open position thereby introducing hydrogen-containing fuel into the fuel distribution path 37 of the auxiliary fuel cell stack 30. The auxiliary fuel cell stack 30 responds to the introduction of hydrogen-containing fuel by producing an electrical output from the electrochemical reactions described above. The controller 90 senses the electrical output from the auxiliary fuel cell stack 30 and then directs the electrical output to the load 97. In this manner, power demands of key-off loads are measured and delivered to the controller 90, and the controller 90 adjusts the auxiliary valve 56 and the auxiliary fuel supply regulator 57 to deliver the necessary amount of hydrogen-containing fuel into the fuel distribution path 37 of the auxiliary fuel cell stack 30 to meet the power demand of the key-off loads.

In still another version of the fuel cell power generation system 8, the controller 90 senses an ambient temperature in which the fuel cell power generation system 8 is located and compares the sensed ambient temperature to a freezing temperature of the primary fuel cell stack 10. If the sensed ambient temperature is at or below a freezing temperature of the primary fuel cell stack 10, the controller 90 provides a fuel delivery signal to the fuel handling subsystem causing the auxiliary valve 56 to move from a closed position to an open position thereby introducing hydrogen-containing fuel into the fuel distribution path 37 of the auxiliary fuel cell stack 30. The auxiliary fuel cell stack 30 responds to the introduction of hydrogen-containing fuel by producing an electrical output from the electrochemical reactions described above. The controller 90 senses the electrical output from the auxiliary fuel cell stack 30 and then directs the electrical output to the coolant fluid heater 76 and the coolant pump 72 of the thermal management subsystem 70 to heat and circulate heated coolant water through the coolant conduit 71 and into the anode coolant flow path 19 and the cathode coolant path 27 of the primary fuel cell stack 10 in order to prevent freezing of the primary fuel cell stack 10. It can be appreciated that the circulation of heated coolant water through the coolant conduit 71 and into the anode coolant flow path 19 and the cathode coolant path 27 of the primary fuel cell stack 10 typically occurs during key-off conditions, and that freezing of the primary fuel cell stack 10 can also be avoided by continuous operation of the auxiliary fuel cell stack 30, the coolant fluid heater 76 and the coolant pump 72 of the thermal management subsystem 70 during key-off conditions.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A fuel cell power generation system comprising:
    a primary fuel cell stack for generating a first quantity of electric power, the primary fuel cell stack including an anode, a cathode, an electrolytic layer positioned between the anode and the cathode, a fuel flow path adjacent a side of the anode opposite the electrolytic layer, and an oxidant flow path adjacent a side of the cathode opposite the electrolytic layer;
    an auxiliary fuel cell stack for generating a second quantity of electric power, the auxiliary fuel cell stack including a fuel electrode, an oxygen electrode, an electrolytic member positioned between the fuel electrode and the oxygen electrode, a fuel distribution path adjacent a side of the fuel electrode opposite the electrolytic member, and an oxidant distribution path adjacent a side of the oxygen electrode opposite the electrolytic member;
    a fuel handling subsystem for feeding a fuel containing hydrogen into the fuel flow path to bring the fuel into contact with the anode of the primary fuel cell stack and for feeding the fuel into the fuel distribution path to bring the fuel into contact with the fuel electrode of the auxiliary fuel cell stack, whereby the contacting of the fuel with the fuel electrode generates the second quantity of electric power from the auxiliary fuel cell stack;
    an oxidant handling subsystem including a compressor for feeding an oxidant containing oxygen into the oxidant flow path to bring the oxidant into contact with the cathode, whereby the contacting of the fuel with the anode and the contacting of the oxidant with the cathode generates the first quantity of electric power from the primary fuel cell stack; and
    a controller electrically connected to the primary fuel cell stack, the auxiliary fuel cell stack, the fuel handling subsystem and the oxidant handling subsystem,
    wherein the controller is operable to sense a startup signal for the fuel cell power generation system, the controller is operable to provide a fuel delivery signal to the fuel handling subsystem to initiate feeding of the fuel into the fuel flow path of the primary fuel cell stack and into the fuel distribution path of the auxiliary fuel cell stack in response to the sensed startup signal, and the controller is operable to apply at least a portion of the second quantity of electric power generated by the auxiliary fuel cell stack to the compressor to run the compressor to feed the oxidant into the oxidant flow path of the primary fuel cell stack in response to the sensed startup signal.

2. The fuel cell power generation system of claim 1 wherein:
    a fuel feed rate of the fuel into the fuel flow path of the primary fuel cell stack and an oxidant feed rate of the oxidant into the oxidant flow path of the primary fuel cell stack are increased after the controller senses the startup signal until the controller senses a first electrical power generation level from the primary fuel cell stack.

3. The fuel cell power generation system of claim 1 wherein:
    the controller applies at least a portion of the second quantity of electric power generated by the auxiliary fuel cell stack to the compressor until the controller senses a first electrical power generation level from the primary fuel cell stack, and
    the controller applies at least a portion of the first quantity of electric power generated by the primary fuel cell stack to the compressor to run the compressor when the controller senses a second electrical power generation level from the primary fuel cell stack.

4. The fuel cell power generation system of claim 3 wherein:
    the first electrical power generation level and the second electrical power generation level are equal.

5. The fuel cell power generation system of claim 1 wherein:
    the auxiliary fuel cell stack is operable to generate the second quantity of electric power at ambient temperature and pressure without humidification.

6. The fuel cell power generation system of claim 1 wherein:
    the auxiliary fuel cell stack is operable to generate the second quantity of electric power without forced flow of oxidant to the oxidant distribution path.

7. The fuel cell power generation system of claim 1 wherein:
    the auxiliary fuel cell stack is operable to utilize all of the hydrogen delivered to the fuel distribution path.

8. The fuel cell power generation system of claim 1 wherein:
    the primary fuel cell stack includes a partition wall adjacent the fuel flow path or the oxidant flow path, the partition wall creating a coolant flow path on a side of the partition wall opposite the fuel flow path or the oxidant flow path, the fuel cell power generation system further comprises a thermal management subsystem including a source of coolant fluid, a coolant conduit loop in fluid communication with opposite ends of the coolant flow path, and a coolant pump in the coolant conduit loop for circulating the coolant fluid in the coolant flow path and the coolant conduit loop, the controller is electrically connected to the thermal management system, and the controller is operable to apply at least a portion of the second quantity of electric power generated by the auxiliary fuel cell stack to the coolant pump to circulate the coolant fluid in the coolant flow path and the coolant conduit loop in response to the sensed startup signal.

9. The fuel cell power generation system of claim 8 wherein:

the thermal management subsystem includes a coolant fluid heater, the controller is operable to sense an ambient temperature of the environment in which the fuel cell power generation system is located, the controller is operable to provide the fuel delivery signal to the fuel handling subsystem to initiate feeding of the fuel into the fuel distribution path of the auxiliary fuel cell stack in response to the ambient temperature, and the controller is operable to apply at least a portion of the second quantity of electric power generated by the auxiliary fuel cell stack to the coolant fluid heater and the coolant pump to circulate heated coolant fluid in the coolant flow path and the coolant conduit loop in response to the ambient temperature.

10. The fuel cell power generation system of claim 1 further comprising:

a water management subsystem in fluid communication with an exit of the oxidant flow path, the water management subsystem including a condenser for separating water from a fluid stream exiting the oxidant flow path and a water pump for transferring the separated water to a water storage tank, wherein the controller is electrically connected to the water management system, and the controller is operable to apply at least a portion of the second quantity of electric power generated by the auxiliary fuel cell stack to the water pump to transfer the separated water to the water storage tank in response to the sensed startup signal.

11. The fuel cell power generation system of claim 1 further comprising:

a load electrically connected to the controller and the auxiliary fuel cell stack, wherein the controller is operable to sense a load demand from the load, the controller is operable to provide the fuel delivery signal to the fuel handling subsystem to initiate feeding of the fuel into the fuel distribution path of the auxiliary fuel cell stack in response to the sensed load demand, and the controller is operable to apply at least a portion of the second quantity of electric power generated by the auxiliary fuel cell stack to the load in response to the sensed load demand.

12. The fuel cell power generation system of claim 1 wherein:

a battery is not required to supply electric power to the fuel handling subsystem and the oxidant handling subsystem.

13. A method for starting a fuel cell power generation system including a primary fuel cell stack for generating a quantity of electric power, the primary fuel cell stack having an anode, a cathode, an electrolytic layer positioned between the anode and the cathode, a fuel flow path adjacent a side of the anode opposite the electrolytic layer, and an oxidant flow path adjacent a side of the cathode opposite the electrolytic layer, the method comprising:

providing an auxiliary fuel cell stack for generating a second quantity of electric power, the auxiliary fuel cell stack including a fuel electrode, an oxygen electrode, an electrolytic member positioned between the fuel electrode and the oxygen electrode, a fuel distribution path adjacent a side of the fuel electrode opposite the electrolytic member, and an oxidant distribution path adjacent a side of the oxygen electrode opposite the electrolytic member;

feeding a fuel containing hydrogen into the fuel distribution path to bring the fuel into contact with the fuel electrode of the auxiliary fuel cell stack to generate the second quantity of electric power from the auxiliary fuel cell stack;

feeding the fuel into the fuel flow path to bring the fuel into contact with the anode of the primary fuel cell stack; and applying at least a portion of the second quantity of electric power generated by the auxiliary fuel cell stack to a compressor to feed an oxidant containing oxygen into the oxidant flow path of the primary fuel cell stack to generate the quantity of electric power.

14. The method of claim 13 further comprising:

sensing a level of electrical power generation from the primary fuel cell stack;

applying the portion of the second quantity of electric power generated by the auxiliary fuel cell stack to the compressor until the sensed level of electrical power generation from the primary fuel cell stack reaches a first electrical power generation level; and applying at least a portion of the first quantity of electric power generated by the primary fuel cell stack to the compressor to run the compressor when the sensed level of electrical power generation from the primary fuel cell stack reaches a second electrical power generation level.

15. The method of claim 14 wherein:

the first electrical power generation level and the second electrical power generation level are equal.

16. The method of claim 13 further comprising:

sensing a level of electrical power generation from the primary fuel cell stack; and increasing a fuel feed rate of the fuel into the fuel flow path of the primary fuel cell stack and increasing an oxidant feed rate of the oxidant into the oxidant flow path of the primary fuel cell stack until the sensed level of electrical power generation from the primary fuel cell stack reaches a first electrical power generation level.

17. The method of claim 13 wherein:

the auxiliary fuel cell stack is operated at ambient temperature and pressure without humidification.

18. The method of claim 13 wherein:

the auxiliary fuel cell stack is operated without forced flow of oxidant to the oxidant distribution path.

19. The method of claim 13 wherein:

the auxiliary fuel cell stack is operated to utilize all of the hydrogen delivered to the fuel distribution path.

\* \* \* \* \*